(12) United States Patent
Doudement et al.

(10) Patent No.: US 6,591,967 B1
(45) Date of Patent: Jul. 15, 2003

(54) CONVEYOR SYSTEM AND INSTALLATION FOR BLOW-MOULDING OF CONTAINERS

(75) Inventors: Gerard Doudement, Le Havre Cedex (FR); Bruno Galloni, Le Havre Cedex (FR)

(73) Assignee: Sidel, Le Havre Cedex (FR)

(*) Notice: Subject to any disclaimer, the term of this patent is extended or adjusted under 35 U.S.C. 154(b) by 0 days.

(21) Appl. No.: 10/009,272

(22) PCT Filed: Jun. 9, 2000

(86) PCT No.: PCT/FR00/01600
§ 371 (c)(1),
(2), (4) Date: Jun. 14, 2002

(87) PCT Pub. No.: WO00/76888
PCT Pub. Date: Dec. 21, 2000

(30) Foreign Application Priority Data

Jun. 14, 1999 (FR) .............................. 99 07652

(51) Int. Cl.⁷ .............................................. B65G 29/00
(52) U.S. Cl. ...................... 198/450; 198/448; 198/441; 198/447
(58) Field of Search ................ 198/448, 449, 198/450, 447, 441

(56) References Cited

U.S. PATENT DOCUMENTS

| | | | |
|---|---|---|---|
| 1,300,010 A | * 4/1919 | Porter ........................ 198/441 |
| 3,098,552 A | * 7/1963 | Schulz ........................ 198/439 |
| 3,104,752 A | * 9/1963 | Rudszinat et al. ........ 198/481.1 |
| 3,219,167 A | 11/1965 | Boinnard | |
| 3,267,821 A | * 8/1966 | Rowlands ..................... 493/45 |
| 3,297,128 A | * 1/1967 | Pagay ........................ 198/448 |
| 3,412,842 A | * 11/1968 | Molins et al. ............... 198/404 |
| 3,485,337 A | * 12/1969 | Everhart ..................... 198/404 |
| 3,637,064 A | 1/1972 | Cvacho et al. | |
| 3,717,239 A | * 2/1973 | Carter ........................ 198/374 |
| 3,785,115 A | 1/1974 | Oberwelland et al. | |
| 4,274,533 A | * 6/1981 | Abe ........................... 198/450 |
| 4,673,078 A | * 6/1987 | Swiatlowski et al. ........ 198/450 |
| 5,501,552 A | 3/1996 | Simkowski | |

* cited by examiner

Primary Examiner—Christopher P. Ellis
Assistant Examiner—Richard Ridley
(74) Attorney, Agent, or Firm—Sughrue Mion, PLLC

(57) ABSTRACT

A conveyor system for discrete entities, including a gathering member supplied by at least two upstream units (26, 27) each of which brings to the gathering member a series of entities (11, 13), and wherein the entities leave the gathering member in a single line. The gathering member includes a gathering wheel (36) driven in rotation and provided with several slots (38, 39) emerging radially at the periphery of the wheel for receiving each entity, and the slots of a common series have the same radial depth, the series of slots being differentiated by the depth of their slots, and each series of slots is associated exclusively with an upstream unit.

9 Claims, 2 Drawing Sheets

CONVEYOR SYSTEM AND INSTALLATION FOR BLOW-MOULDING OF CONTAINERS

Figure 1:
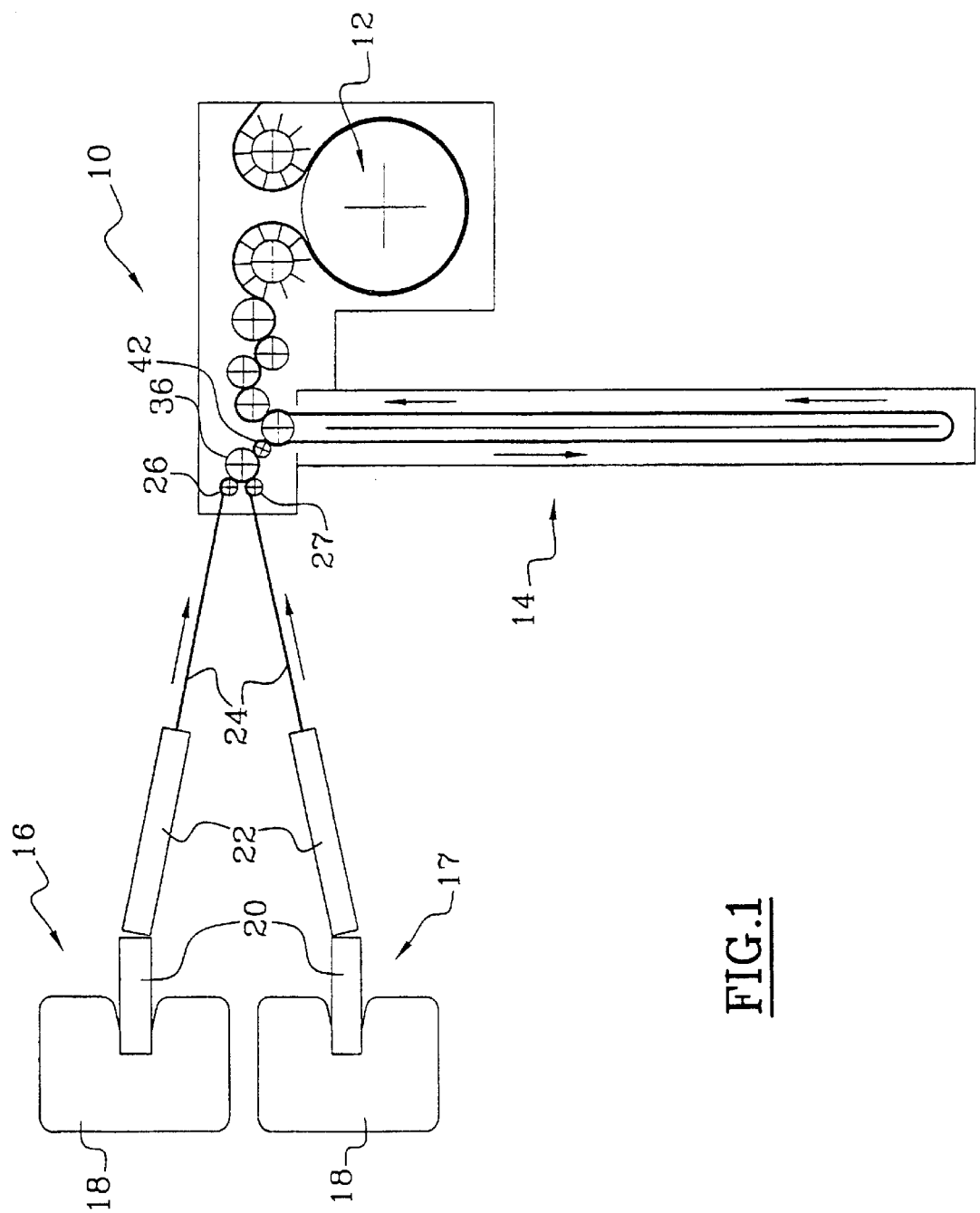

The invention concerns conveyor systems for discrete entities, that is, for carrying individual items.

The invention will be more particularly described within the scope of its application to a container blow-molding facility in which the container is obtained by blowing a preform previously produced by injection.

However, the invention will find application in any conveyor system in which it is desired to merge in a single line and at a specific rate entities coming from several "sources."

Such a merging would be necessary, for example, in a facility when several slow-speed machines are used to perform the same step, in parallel, the entities being then all processed in a second step by a high-speed machine.

The example that will be described in detail is that of the feed for a preform temperature condition oven. Such an oven generally has a conveyor chain or wheel that transports the preforms in front of infrared lamps in order to bring them to a temperature at which the thermoplastic material becomes deformable for the last blow-molding operation.

The oven is usually fed with preforms by a single feed unit. This feed unit usually has a bin in which the preforms are stored in bulk, an inclined belt conveyor, a device to disentangle the preforms, and an inclined feed rail at the bottom of which the vertically oriented preforms are accumulated to form a buffer stock. At the bottom of this rail, an automatic gate allows a preform to pass at regular intervals, the preform then being engaged by a wheel with recesses.

Such feed units have the disadvantage of a lack of reliability at high speed, particularly because of the disentangling operation, which is very delicate.

Also, for the proper operation of the blow-molding facility, it is proposed here to feed the facility by two feed units that work in parallel. Each feed unit thus only has to provide half of the rate of the blow-molding facility.

However, it then becomes necessary to provide a conveyor system that merges the preforms furnished by the two feed units in such a way that at the oven, everything takes place as though the facility had a single feed unit.

This system should be simple, reliable and small in size.

The invention therefore proposes a system for conveying discrete entities, which system has a merging device fed by at least two upstream units each of which leads to the device for merging the entities that are spaced according to a first rate of speed, and of the type in which the entities leave the merging device in a single line at a second rate of speed, characterized in that the merging device has a merging wheel that is driven in rotation and is provided with several series of recesses that open radially toward to periphery of the wheel, in that the entities are each radially engaged from the exterior toward the interior in one recess, in that the recesses of a same series have the same radial depth, the series of recesses being differentiated by the depth of their recesses, in that each series of recesses is associated exclusively with one upstream unit.

According to other characteristics of the invention:
the different series of recesses fit into each other;
each upstream unit delivers its entities at a different loading point that occupies an angularly fixed position around the axis of the merge wheel, and the point of loading associated with the series of deepest recesses is placed the farthest upstream on the trajectory of the recesses of the merge wheel;
after the point of loading, the entity is guided between two internal and external slide rails that are placed in a plane axially offset with respect to the plane of the merge wheel, and the external slide rail forces the entity toward the bottom of the recess;
the difference in depth between two recesses of two different series is greater than the dimension of one entity in the radial direction;
the merging device has a slide rail which, on one part of the path of the wheel between the point of loading of the last series of entities and the point of discharge, cooperates with the entities to push them toward the peripheral edge of the merge wheel;
at least one of the upstream units has a wheel with recesses that is placed tangentially to the merge wheel; and
the entities are preforms for the blow-molding manufacture of containers from thermoplastic material.

The invention also proposes a facility for blow-molding containers from previously injected preforms, of the type having an oven for temperature conditioning the preforms, characterized in that the oven is fed with preforms by at least two feed units that are arranged in parallel and each of which delivers a series of regularly spaced preforms, and in that, between the feed units and the oven, the preforms are transported by a conveyor system incorporating any one of the preceding characteristics, the system merging the series of preforms in order to form a single series of preforms.

Figure 2:
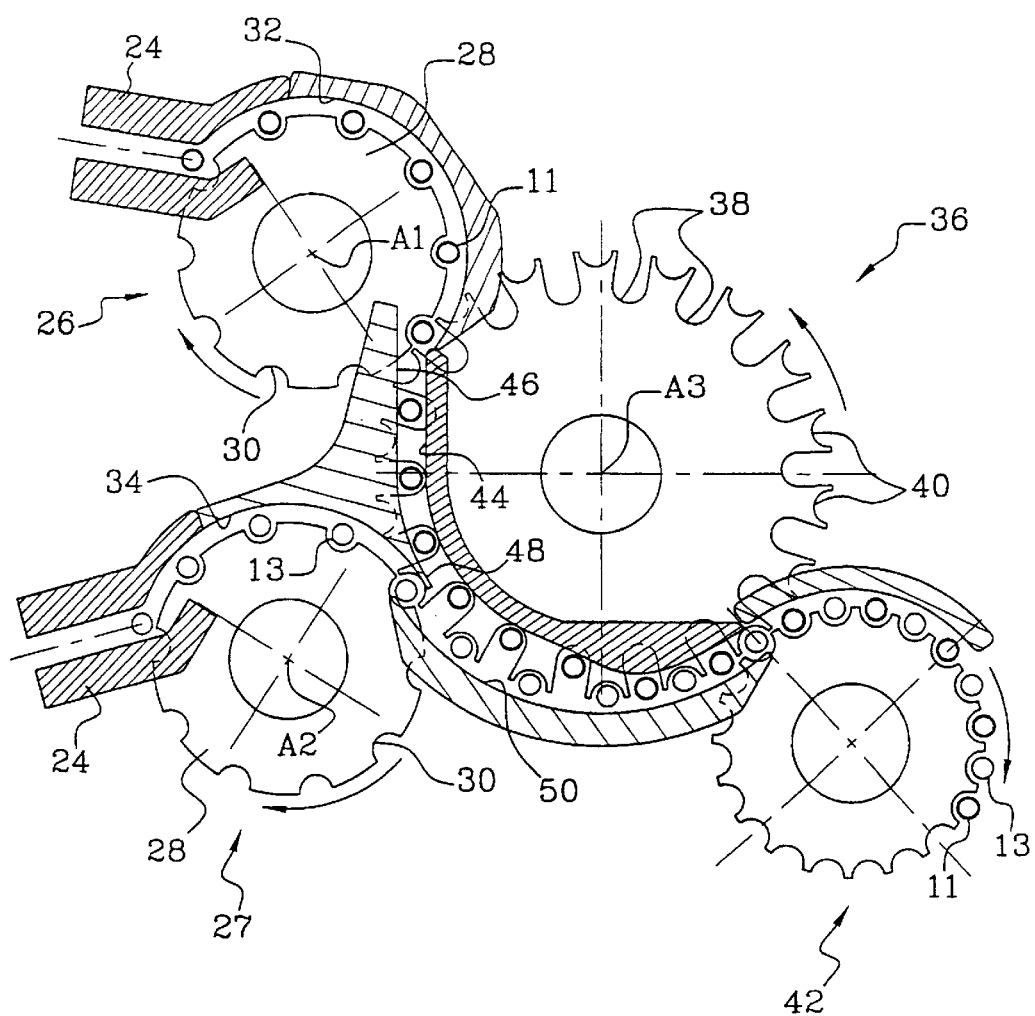

Other characteristics and advantages of the invention will appear in the following detailed description as well as in the attached drawings in which:

FIG. 1 is a diagrammatic view illustrating a facility for blow-molding containers in which the oven is fed with preforms by two units operating in parallel; and FIG. 2 is a diagrammatic representation of a conveyor system according to the invention.

FIG. 1 illustrates a machine 10 for blow-molding containers from thermoplastic material, for example polyethylene terephtalate (PET) bottles. The machine 10 essentially has a blow-molding unit 12 and a temperature condition oven 14 in which the preforms 11, 13, produced previously by injecting molding, are brought to a temperature that is higher than the glass transition temperature of the material of which they are made. In an original way, the oven 14 is fed by two feed units 16, 17 arranged in parallel. The units 16, 17 can be standard commercial parts.

For example, these units 16, 17 can be of the type having a bin 18 in the form of a hopper, a conveyor belt 20, a device 22 for untangling the preforms and an inclined feed rail 24. The preforms are removed from the bin 18, vertically oriented by the untangling device 22, and accumulate at the bottom of the rail 24 simply by gravity. They are then held, for example, by a ring placed at the base of their neck. At the bottom of the rail, a gate (not shown), for example made in the form of a retractable arm, allows the preforms to pass one by one so that they are engaged by a feed wheel 26, 27. The feed wheel here comprises a wheel with recesses. Each feed unit 16, 17, furnished with its feed wheel 26, 27, is able to furnish a series of preforms spaced according to a first rate of speed. Feed units of this type are used, for example, in the blow-molding facilities marketed by the applicant.

Illustrated in FIG. 2 are two feed wheels 26, 27, from the two units 16, 17, as well as the lower end of the two associated feed rails 24 by which the two series 11, 13 of preforms arrive.

In a known way, the feed wheels 26, 27 are each composed of a disk 28 which has around its periphery recesses 30 that are appreciably semicircular and regularly spaced. The disks 28 are driven continuously in rotation around their respective axes A1 and A2. The gate (not represented) of the feed system is controlled so that when a recess 30 faces the end of the rail 24, a preform is released, is engaged in the recess, which then drives it in rotation. An external circular guide 32, 31 prevents the preform from escaping from the recess 30, the radial depth of which is appreciably equal to half the diameter of the preform. After they are taken by the feed wheels, the preforms are always conveyed individually, the transfer always being performed without the preform being released. Indeed, it is important that the preform preserve its orientation, particularly in order to be able to be controlled in the oven.

According to the methods of the invention, the two feed wheels 26, 27, which are identical, are intended to feed the same merge wheel 36. At the outlet of this merge wheel the two series 11, 13 of preforms provided by the feed units are merged into a single set of preforms at a new spacing, preferably the spacing of the preform conveyor system in the oven 14.

The merge wheel 36 also comprises a disk that is driven in rotation around its axis A3 in synchronization with the two feed wheels 26, 27. According to the invention, the merge wheel has recesses that are made in the periphery of the disk and are distributed in as many series as there are feed units. The series of recesses differ by the radial depth of their recesses, which are oriented radially with respect to the axis A3 and are open outward.

In the example illustrated, the merge wheel 36 has two series of recesses 38, 40. The recesses 38 of the first series have a relatively large radial depth, for example on the order of twice the diameter of the preforms. The recesses 40 of the second series are also semicircular and have a depth on the order of one half the diameter of the preform.

The recesses of both series are interspersed along the periphery of the disk in such a way that there is alternatively a recess of one of the series then a recess of the other series. The recesses 38, 40 of the merge wheel are spaced circumferentially at a rate of one half the space separating two recesses 30 of the feed wheels 26, 27.

The two feed wheels 26, 27 are arranged tangentially to the merge wheel 36 and are synchronized therewith so that when a recess 30 is at the point of tangency, it is exactly in front of a recess 38, 40 of the merge wheel. According to the invention, the recesses 30 of a given feed wheel will necessarily be in front of a recess of a given series of the merge wheel 36. Conversely, the two points of tangency of the merge wheel 36 are chosen so that the recesses 38, 40 of a same series can only face the recesses of one of the two feed wheels. The loading of the preforms in the recesses of the merge wheel is accomplished radially from the outside toward the inside. Even at the moment it passes from the feed wheel to the merge wheel, the preform continues to perfectly held and indexed, which makes it possible to preserve exactly the spacing between two preforms of the same series.

The guidance system according to the invention, therefore, comprises slide rails that make it possible to determine the radial position of the preforms that are taken in the recesses of the merge wheel. These slide rails, for example, are made in the form of fixed plates that are arranged in a plane axially offset with respect to the plane of the disks of the wheels, and one edge of which forms a slide rail on which the preforms are radially supported and slide when they are driven in rotation by the wheels.

In FIG. 2 it can be seen that the first feed wheel 26, the point of tangency of which is the farthest away from the point of tangency of the merge wheel 36 with a discharge wheel 42, is intended guide the preforms 11 into the deep recesses 38 of the merge wheel. The loading of the preforms 11 of this first series is therefore done at this point of tangency, due to an internal slide rail 44 and to a first external slide rail 46. The external slide rail 46 pushes the preforms out of the recesses 30 of the first loading wheel 26. The two slide rails 44, 46 then cooperate with the preforms of this first series to push them radially into and toward the bottom of the recesses 38 as they progress angularly around the axis A3.

It can be seen that, by the action of the slides 44, 46, the preforms 11 of this first series have reached the bottom of the respective recess 38 before they angularly reach the point of tangency of the second feed wheel 27 with the merge wheel 36.

In the example illustrated, the exterior slide rail 46 corresponding to the first feed wheel 26 and the guide 34 of the second feed wheel 27 are formed by two edges of the same plate element that thus has a sharp point 48 delimited by the respective ends of the guide 34 and of the first exterior slide rail 46. The end of this point 48 is situated angularly just before the point of loading of the second series of preforms, this point corresponding to the point of tangency of the second feed wheel 27 with the merge wheel 36. This point 48 extends radially with respect to the axis A3 between the bottom of the recesses 38 of the first series and that of the recesses 40 of the second series. Obviously the point 48 should not create an obstacle to a preform 11 of the first series that would be guided by a recess 38 of the merge wheel 36.

As a result of the invention, it can be seen that the first preforms 11 are thus radially released toward the interior so as not to interfere with the guide 34 of the second feed wheel 27.

A second exterior slide rail 50 extends along an arc of a circle around the axis A3 between the point of loading of the preforms 13 of the second series and the point of discharge of all the preforms that corresponds to the point of tangency of the merge wheel 36 with the discharge wheel 42. The principal purpose of this second slide rail 50 is to hold the preforms of the second series supported at the bottom of their recesses 40, without which these preforms would not stay on the wheel 36.

Unlike the first exterior slide rail 46, the interior slide rail 44 extends along a second section between the point of loading of the second series of preforms 13 and the point of discharge. The contour of this second section is such that it forces the preforms 11 of the first series radially toward the exterior once they have passed the discharge point of the preforms of the second series. Beyond this point, there is no longer any risk of the preforms 11 of the first series interfering with a guide of the second feed wheel. The second section of the interior slide rail thus makes it possible radially to place the preforms 11 from the first series on the same radius as the preforms 13 from the second series.

Thus, at the point of discharge, the preforms 11, 13 from both series are taken radially between the interior slide rail 44 and the second exterior slide rail 50. They can then be taken over by the discharge wheel 42.

The merge device thus proposed is therefore completely reliable because the entities it transports, for example the preforms, remain perfectly indexed at all times during their course because they are held in the recesses. There is therefore no risk of their becoming snarled or blocked against part of this component, as can occur with a switching mechanism. Of course, they also preserve their vertical orientation for the full length of their path on the feed and merge wheels.

The invention has just been described for a case in which the preceding unit has wheels with recesses that provide the feed. However, a merge wheel according to the invention could also be used without a feed system or by using a different system. The entities could thus be placed on the merge wheel by synchronized transfer arms.

What is claimed is:

1. System for conveying discrete entities, which system has a merging device (36) fed by at least two upstream units (16, 17) each of which leads to the device for merging the entities (11, 13), and of the type in which the entities leave the merging device (36) in a single line, characterized in that the merging device has a merging wheel (36) that is driven in rotation and is provided with several series of recesses (38, 40) that open radially toward to periphery of the wheel, in that the entities are each radially engaged from the exterior toward the interior in one recess, in that the recesses of a same series have the same radial depth, the series of recesses being differentiated by the depth of their recesses, and in that each series of recesses is associated exclusively with one upstream unit.

2. Conveyor system according to claim 1, characterized in that the different series of recesses (38, 40) fit into each other.

3. Conveyor system according to claim 1, characterized in that each upstream unit (16, 17) delivers its entities at a different loading point that occupies an angularly fixed position around the axis (A3) of the merge wheel (36), and in that the point of loading associated with the series of deepest recesses (38) is placed the farthest upstream on the trajectory of the recesses of the merge wheel (36).

4. Conveyor system according to claim 3, characterized in that after the point of loading, the entity is guided between two internal (44) and external (46) slide rails that are placed in a plane axially offset with respect to the plane of the merge wheel (36), and in that the external slide rail (46) forces the entity toward the bottom of the recess (38).

5. Conveyor system according to claim 1, characterized in that the difference in depth between two recesses (38, 40) of two different series is greater than the dimension of one entity in the radial direction.

6. Conveyor system according to claim 1, characterized in that the merging device has a slide rail (44) which, on one part of the path of the wheel between the point of loading of the last series of entities and the point of discharge, cooperates with the entities to push them toward the peripheral edge of the merge wheel (36).

7. Conveyor system according to claim 1, characterized in that at least one of the upstream units has a wheel (26, 27) with recesses that is placed tangentially to the merge wheel (36).

8. Conveyor system according to claim 1, characterized in that the entities are preforms for a blow-molding manufacture of containers from thermoplastic material.

9. Facility for blow-molding containers from previously injected preforms, of the type having an oven (14) for temperature conditioning the preforms, characterized in that the oven (14) is fed with preforms by at least two feed units that are arranged in parallel and each of which delivers a series of regularly spaced preforms, and in that, between the feed units and the oven, the preforms are transported by a conveyor system according to any of the preceding claims, the system merging the series of preforms in order to form a single series of preforms.

* * * * *